(12) United States Patent
Wang (10) Patent No.: US 9,229,153 B2
(45) Date of Patent: Jan. 5, 2016

(54) WARNING DEVICE

(71) Applicant: Min-Hsueh Wang, New Taipei (TW)

(72) Inventor: Min-Hsueh Wang, New Taipei (TW)

( * ) Notice: Subject to any disclaimer, the term of this patent is extended or adjusted under 35 U.S.C. 154(b) by 151 days.

(21) Appl. No.: 14/196,348

(22) Filed: Mar. 4, 2014

(65) Prior Publication Data

US 2014/0254197 A1    Sep. 11, 2014

(30) Foreign Application Priority Data

Mar. 11, 2013    (TW) .............................. 102204442 U (51) Int. Cl.
*F21V 8/00* (2006.01)
*F21V 21/08* (2006.01)
*F21K 99/00* (2010.01)

(52) U.S. Cl.
CPC ................ *G02B 6/0076* (2013.01); *F21K 9/30* (2013.01); *F21V 21/0832* (2013.01); *G02B 6/0053* (2013.01); *F21V 2200/20* (2015.01); *G02B 6/0083* (2013.01); *G02B 6/0088* (2013.01); *G02B 6/0096* (2013.01)

(58) Field of Classification Search
None
See application file for complete search history.

(56) References Cited

U.S. PATENT DOCUMENTS

| 8,770,812 | B2 * | 7/2014 | Kino | ...................... | B60Q 1/323 362/23.17 |
| 2009/0161388 | A1 * | 6/2009 | Kato | ...................... | G02B 6/006 362/625 |

* cited by examiner

*Primary Examiner* — Thomas M Sember
(74) *Attorney, Agent, or Firm* — Guice Patents PLLC (57) ABSTRACT

The present invention provides a warning device, which includes a housing; a bottom cover, an accommodation space is formed through the bottom cover being engaged with the housing; a first light guide plate formed with a plurality of first light guide strips; a second light guide plate formed with a plurality of second light guide strips, and the arranged direction of the plural second light guide strips is perpendicular to the arranged direction of the plural first light guide strips; a light source module installed with at least a LED; and a switch module installed with a printed circuit board, the printed circuit board is provided with a switch and a microcontroller, when the switch is pressed, the microcontroller drives the LED for enabling a plurality of pointy light sources to be formed and emitted through the first light guide plate.

20 Claims, 8 Drawing Sheets

WARNING DEVICE

BACKGROUND OF THE INVENTION

1. Field of the Invention

The present invention relates to a warning device, especially to a warning device capable of being installed on a bicycle, an energy-saving motorbike, a vehicle, an advertisement billboard, a traffic signal or being provided on a cloth or a helmet for displaying the warning pattern or text.

2. Description of Related Art

In view of the oil price being boosted and there is no sign of lowering down, the trend of saving energy and reducing carbon consumption is getting more popular in every country, and every government in the world also encourages the people to reduce the car usage for lowering the oil consumption, and also reduce the electric power consumption for lowering the discharged amount of carbon dioxide.

An intersection often requires at least a traffic signal for ensuring the road safety, so each city has built an enormous amount of traffic signals. A conventional traffic signal often utilizes a neon lamp such as a halogen lamp as its light source, but it is well known that the neon lamp consumes large amount of electric power; for lowering the electric power consumption, a traffic signal utilizing LED as a light source has been greatly adopted by each country for replacing the convention neon-lamp traffic signal.

However, a conventional traffic signal utilizes a plurality of LEDs for forming as a concentric round pattern so as to be served as the required round light source.

The above-mentioned LED traffic signal requires plural LEDs, so the purchase cost is relatively higher, and the plural LEDs would consume quite a lot of electric energy.

SUMMARY OF THE INVENTION

One primary objective of the present invention is to provide a warning device, which is capable of being installed on a bicycle, an energy-saving motorbike, a vehicle, an advertisement billboard, a traffic signal or being provided on a cloth or a helmet for displaying the warning pattern or text.

Another objective of the present invention is to provide a warning device, in which only a small amount of LEDs are needed for forming a plurality of pointy light sources required for displaying a pattern or text.

For achieving said objectives, the present invention provides a warning device, which includes a housing formed with an opening; a bottom cover disposed at the bottom of the housing, an accommodation space is formed through the bottom cover being engaged with the housing; a first light guide plate accommodated in the accommodation space and partially exposed outside the opening, and formed with a plurality of first light guide strips; a second light guide plate disposed at the bottom of the first light guide plate, and formed with a plurality of second light guide strips, and the arranged direction of the plural second light guide strips is perpendicular to the arranged direction of the plural first light guide strips; a light source module disposed at one side of the second light guide plate, and installed with at least a LED; and a switch module accommodated in the accommodation space, and installed with a printed circuit board, the printed circuit board is provided with a switch and a microcontroller, when the switch is pressed, the microcontroller drives the LED for enabling a plurality of pointy light sources to be formed and emitted through the first light guide plate.

For achieving said objectives, the present invention provides a warning device, which includes a top housing formed with a first opening; a bottom cover disposed at the bottom of the top housing, a first accommodation space is formed through the bottom cover being engaged with the top housing; a first light guide plate accommodated in the first accommodation space and partially exposed outside the first opening, and formed with a plurality of first light guide strips; a second light guide plate disposed at the bottom of the first light guide plate, and formed with a plurality of second light guide strips, and the arranged direction of the plural second light guide strips is perpendicular to the arranged direction of the plural first light guide strips; a light source module installed with at least a LED; a switch module accommodated in the first accommodation space, and installed with a printed circuit board, the printed circuit board is provided with a switch and a microcontroller; a bottom housing formed with a second opening, disposed at the bottom of the bottom cover, a second accommodation space is formed through the bottom housing being engaged with the bottom cover; a third light guide plate accommodated in the second accommodation space and partially exposed outside the second opening, and formed with a plurality of third light guide strips; and a fourth light guide plate disposed at the bottom of the third light guide plate, and formed with a plurality of fourth light guide strips, and the arranged direction of the plural fourth light guide strips is perpendicular to the arranged direction of the plural third light guide strips; when the switch is pressed, the microcontroller drives the LED for enabling a plurality of pointy light sources to be formed and emitted through the first light guide plate and the third light guide plate.

DETAILED DESCRIPTION OF THE PREFERRED EMBODIMENT

Figure 1:
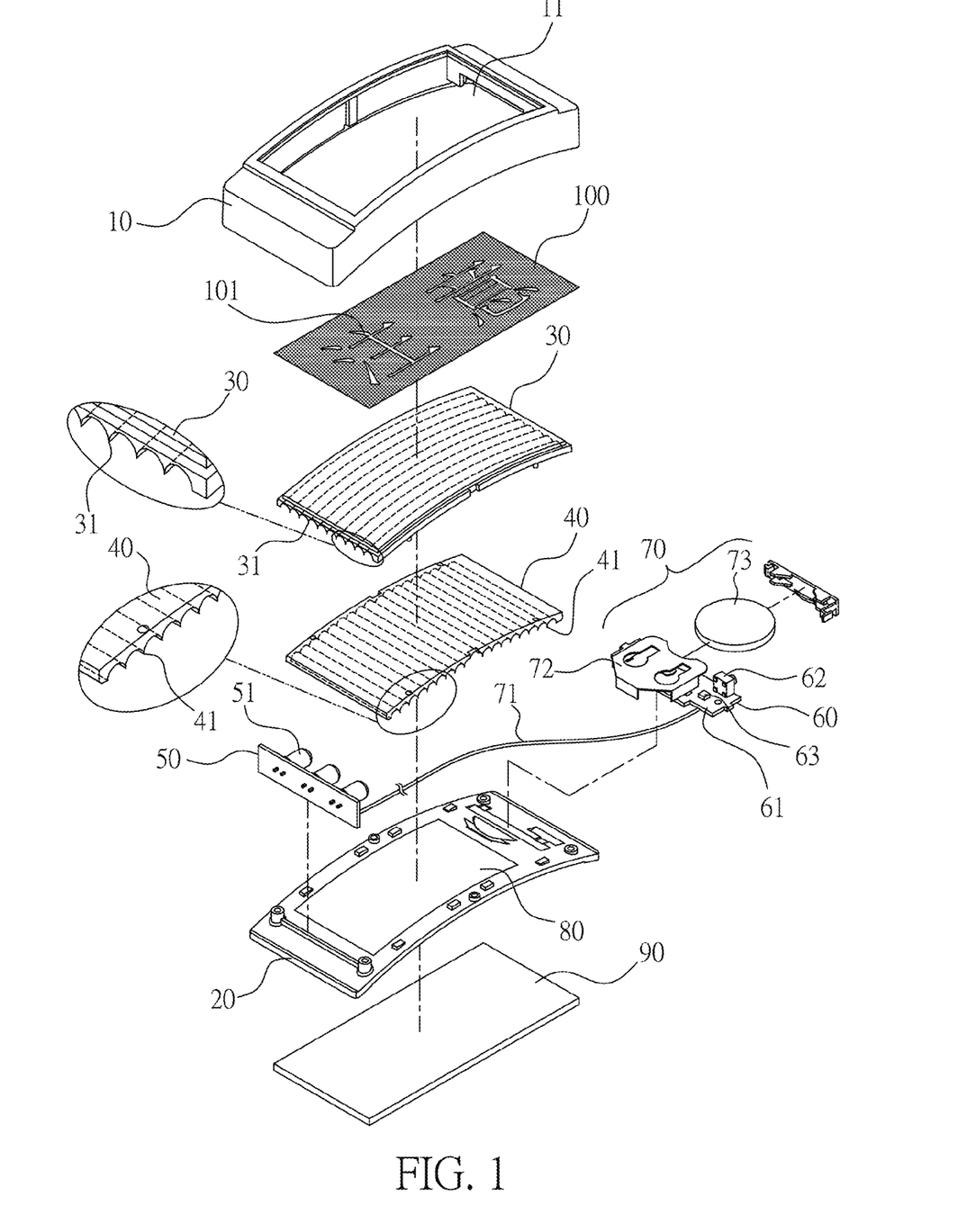
FIG. 1 is an exploded view illustrating the warning device according to a preferred embodiment of the present invention.
Figures 2, 3:
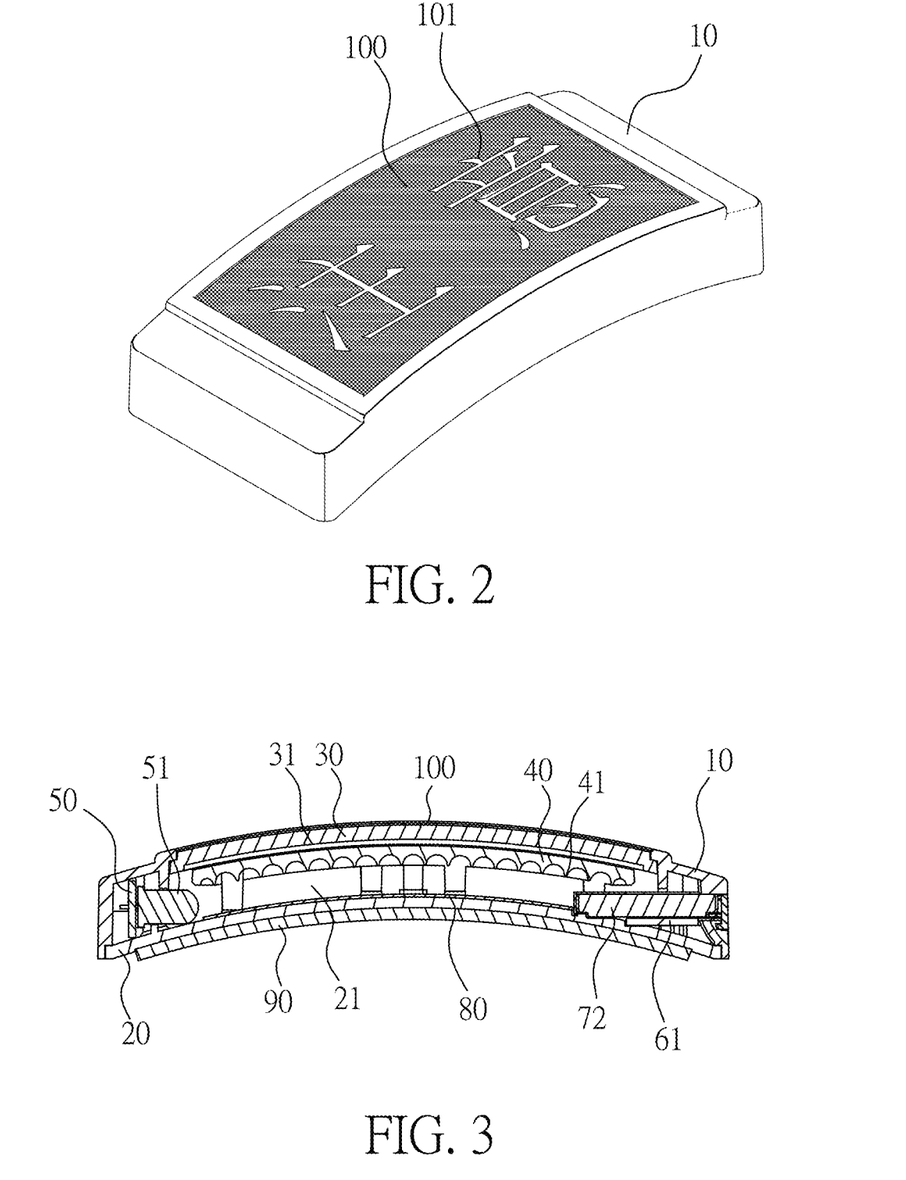
FIG. 2 is a schematic view illustrating the assembly of the warning device according to a preferred embodiment of the present invention.
FIG. 3 is a cross sectional view illustrating the assembly of the warning device according to a preferred embodiment of the present invention.

Referring from FIG. 1 to FIG. 3, wherein FIG. 1 is an exploded view illustrating the warning device according to a preferred embodiment of the present invention; FIG. 2 is a schematic view illustrating the assembly of the warning device according to a preferred embodiment of the present invention; and FIG. 3 is a cross sectional view illustrating the assembly of the warning device according to a preferred embodiment of the present invention.

As shown in figures, the present invention provides a warning device, which can be installed on a bicycle, an energy-saving advertisement billboard for motorbike or vehicle, a traffic signal post or be worn on a cloth, the warning device includes: a housing 10, a bottom cover 20, a first light guide plate 30, a second light guide plate 40, a light source module 50 and a switch module 60.

The housing 10 is made of an insulation material, e.g. but not limited to plastic, and formed with an opening 11.

The bottom cover 20 is made of an insulation material, e.g. but not limited to plastic, and disposed at the bottom of the housing 10, an accommodation space 21 is formed through the bottom cover 20 being engaged with the housing 10.

The first light guide plate 30 is made of a light-pervious material, e.g. but not limited to a red plastic plate, and e.g. but not limited to be formed in a bending status or a planar status; the first light guide plate 30 is accommodated in the accommodation space 21 and partially exposed outside the opening 11, and formed with a plurality of first light guide strips 31, the plural first light guide strips 31 are e.g. but not limited to be formed in a U shape, and disposed at the bottom of the first light guide plate 30, each of the first light guide strips 31 is parallel to each other and arranged towards a direction e.g. but not limited to a horizontal direction. According to this embodiment, the first light guide plate 30 being formed in the bending status is adopted for illustration and shall not be a limitation to the scope of the present invention.

The second light guide plate 40 is made of a light-pervious material, e.g. but not limited to a red plastic plate, and e.g. but not limited to be formed in a bending status or a planar status; the second light guide plate 40 is disposed at the bottom of the first light guide plate 30, and formed with a plurality of second light guide strips 41, the plural second light guide strips 41 are e.g. but not limited to be formed in a U shape, each of the second light guide strips 41 is parallel to each other and arranged towards a direction e.g. but not limited to a vertical direction, the arranged direction of the plural second light guide strips 41 is perpendicular to the arranged direction of the plural first light guide strips 31, the plural second light guide strips 41 and the plural first light guide strips 31 are vertically stacked thereby forming a plurality of cross points arranged in an array format. According to this embodiment, the second light guide plate 40 being formed in the bending status is adopted for illustration and shall not be a limitation to the scope of the present invention The light source module 50 is disposed at one side of the second light guide plate 40, e.g. but not limited to the left side, the right side or the rear side, and installed with at least a LED 51, the quantity thereof is e.g. but not limited to three, and the light emitting direction is preferably to be perpendicular to the plural second light guide strips 41, and the LED 51 is e.g. but not limited to a high-brightness white light LED. Wherein, when the light source module 50 is disposed at the left side or the right side of the second light guide plate 40, the lights emitted by the LED 51 can project from the left side or the right side and be guided through two end parts of the U-shaped second light guide strips 41 then be guided through two end parts of the U-shaped first light guide strips 31 so as to be outputted, thereby forming plural cross points arranged in an array format. When the light source module 50 is disposed at the rear side of the second light guide plate 40, the lights emitted by the LED 51 can project from the rear side and be guided through two end parts of the U-shaped second light guide strips 41 then be guided through two end parts of the U-shaped first light guide strips 31 so as to be outputted, thereby forming plural cross points arranged in an array format, and the brightness generated is greater than the brightness generated through the light source module 50 being disposed at the left side or the right side.

The switch module 60 is accommodated in the accommodation space 21 and installed with a printed circuit board 61, the printed circuit board 61 is provided with a switch 62 and a microcontroller 63, when the switch 62 is pressed, the microcontroller 63 drives the LED 51, so a plurality of pointy light sources with even brightness are obtained through the cross points arranged in the array format formed by the plural second light guide strips 41 and the plural first light guide strips 31.

In addition, the warning device provided by the present invention further includes a power source module 70, which is coupled to the switch module 60 and coupled to the light source module 50 disposed at the opposite side through a wire 71 for supplying the required electric power. Wherein, the power source module 70 is e.g. but not limited to a battery, or includes a battery seat and a button cell battery; according to this embodiment, a battery seat 72 and a button cell battery 73 are adopted for illustration and shall not be a limitation to the scope of the present invention, wherein one end of the battery seat 72 is fastened on the printed circuit board 60, and the other end thereof is fastened on the bottom cover 20.

Or, the power source module 70 can further includes a socket and a AC to DC converter (both not shown in figures), the AC to DC converter is served to convert an AC power source into a DC power source then be inserted in the socket for supplying the required electric power.

Or, the power source module 70 can further includes a socket and a solar panel (both not shown in figures), the solar panel is serve to convert sunlight into a DC power source then be inserted in the socket for supplying the required electric power.

In addition, the warning device provided by the present invention further includes a light reflection paper 80 which is disposed on the bottom cover 20 and used for reflecting the lights emitted by the LED 51 to the plural second light guide strips 41.

Moreover, the warning device provided by the present invention further includes a Velcro fastener 90 which is disposed at the outer side of the bottom cover 20 and used for fastening the warning device on an object, wherein the object is e.g. but not limited to a bicycle, a traffic signal post or a cloth.

Moreover, the warning device provided by the present invention further includes a light-pervious plate 100 which is disposed at the top of the opening 11 and provided with a pattern or text 101, the pattern or text 101 is able to be displayed through lights; according to this embodiment, a text of "ATTENTION" is adopted for illustration and shall not be a limitation to the scope of the present invention, the pattern or text 101 is formed through a light-tight tape being processed with an intaglio means, then the pattern or text 101 is adhered on the light-pervious plate 100.

According to the present invention, only a small amount of LEDs 51 are arranged at the locations perpendicular to the plural second light guide strips 41, and a plurality of pointy light sources with even brightness can be obtained through the cross points arranged in the array format formed by the plural second light guide strips 41 and the plural first light guide strips 31, so pedestrians can clearly see the "ATTE-NEION" or other text or pattern or other advertisement picture or promotion texts shown by the warning device even from a remote location, objectives of lowering production cost and reducing electric power consumption can therefore be achieved.

Figure 4:
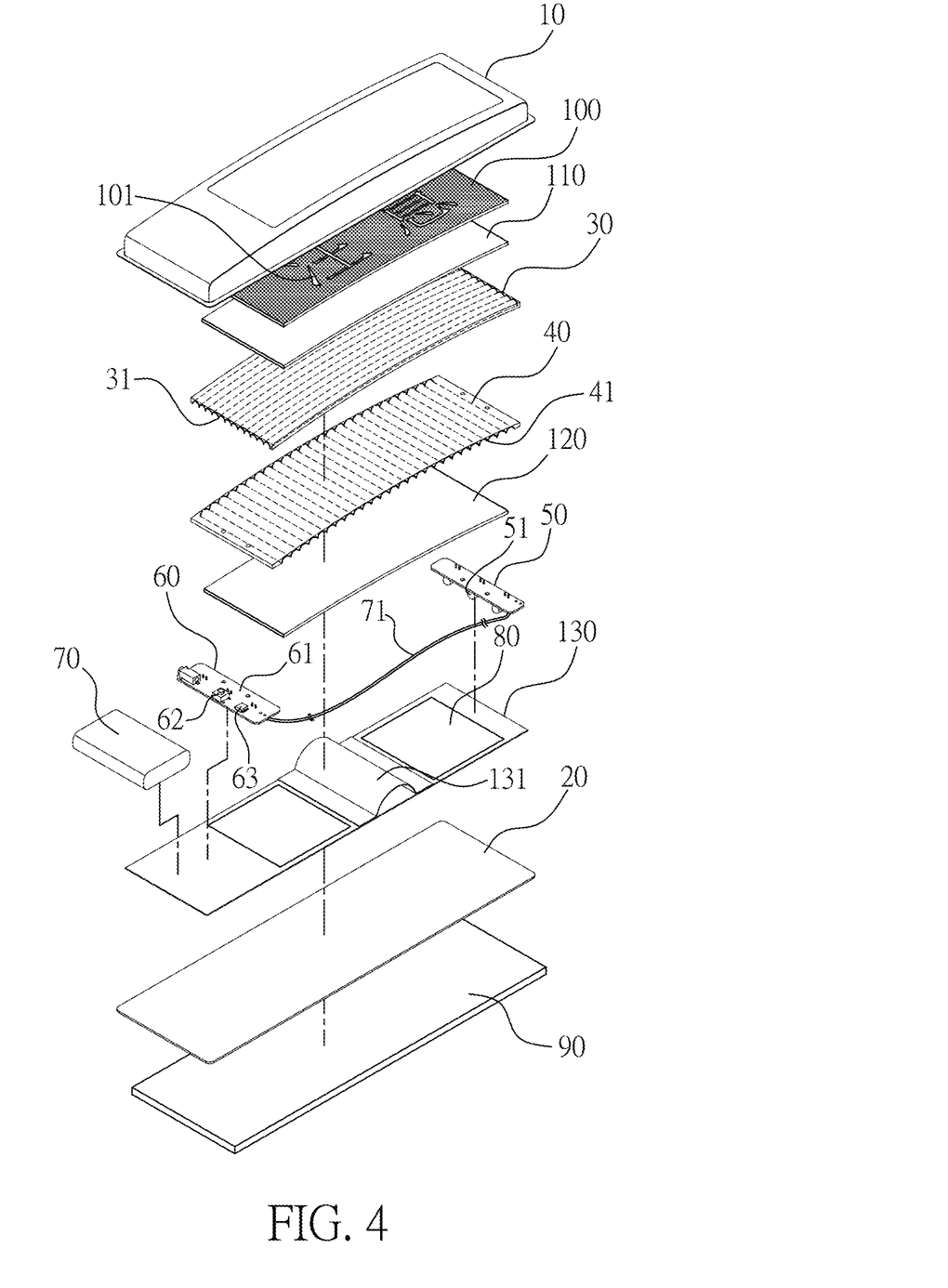
FIG. 4 is an exploded view illustrating the warning device according to another preferred embodiment of the present invention.
Figure 5:
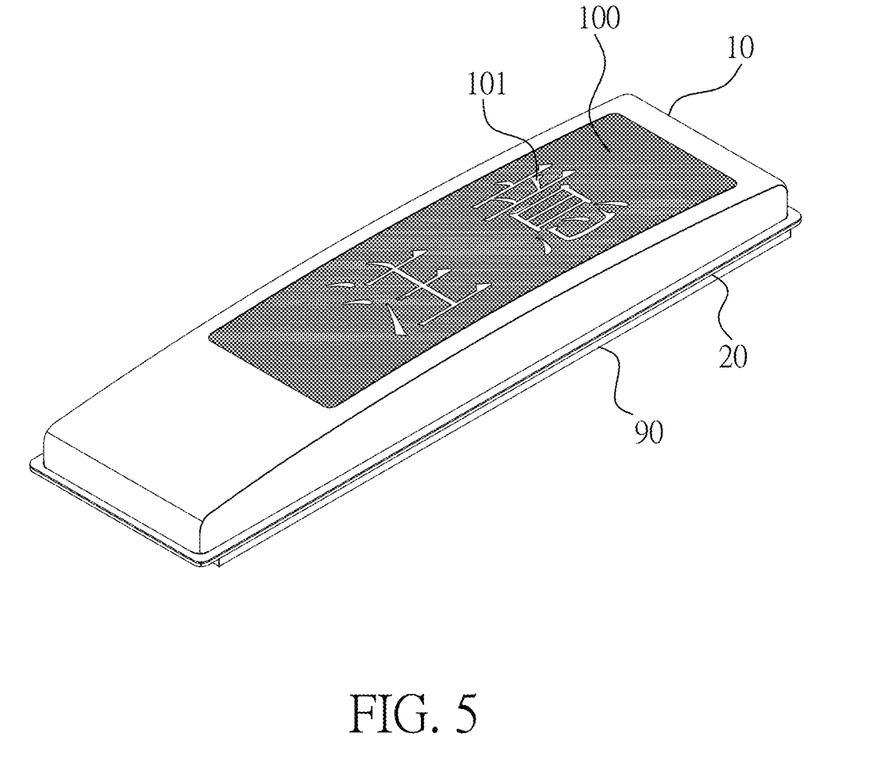
FIG. 5 is a schematic view illustrating the assembly of the warning device according to another preferred embodiment of the present invention.
Figure 6:
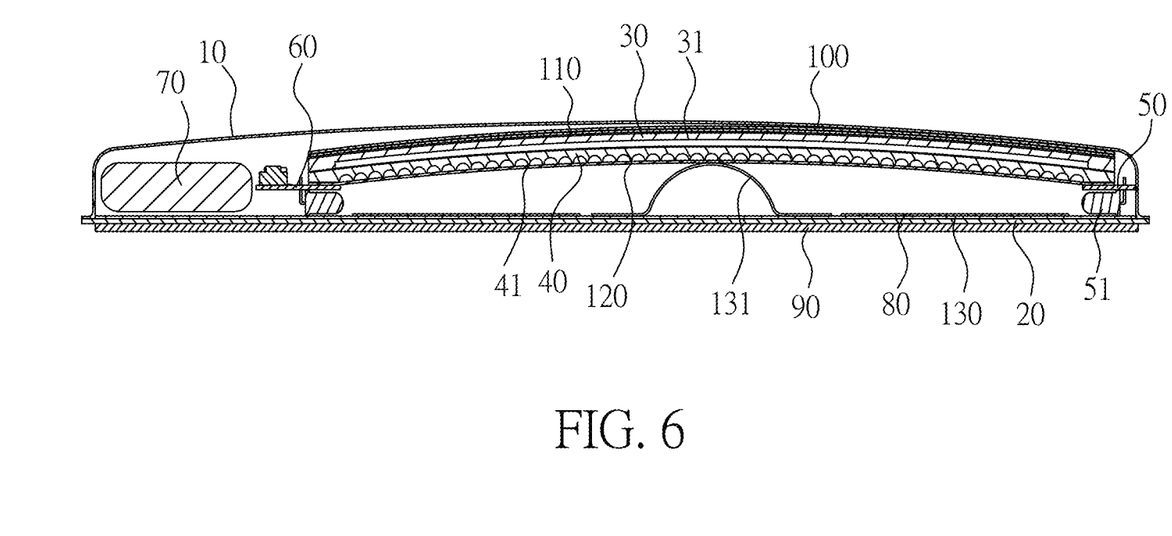
FIG. 6 is a cross sectional view illustrating the assembly of the warning device according to another preferred embodiment of the present invention.

Referring from FIG. 4 to FIG. 6, wherein FIG. 4 is an exploded view illustrating the warning device according to another preferred embodiment of the present invention; FIG. 5 is a schematic view illustrating the assembly of the warning device according to another preferred embodiment of the present invention; and FIG. 6 is a cross sectional view illustrating the assembly of the warning device according to another preferred embodiment of the present invention.

As shown in figures, according to another preferred embodiment of the present invention, the warning device includes the housing 10, the bottom cover 20, the first light guide plate 30, the second light guide plate 40, the light source module 50, the switch module 60, the power source module 70, the light reflection paper 80, the Velcro fastener 90 and the light-pervious plate 110, and further includes a first light collecting fasten sheet 110, a second light collecting fasten sheet 120 and a protection sheet 130.

The first light collecting fasten sheet 110 is disposed at the top of the first light guide plate 30 and used for fastening the first light guide plate 30 and collecting the lights emitted by the first light guide plate 30.

The second light collecting fasten sheet 120 is disposed at the bottom of the second light guide plate 40 and used for fastening the second light guide plate 40 and collecting the lights emitted by the LED 51.

The protection sheet 130 is disposed at the top of the bottom cover 20, and formed with a protection groove 131; when being pressed, the protection groove 131 can be served to prevent the pattern or text 101 from being deformed.

In addition, according to this embodiment, a rechargeable Lithium-ion battery being adopted as the power source module 70 is served for illustration and shall not be a limitation to the scope of the present invention; as what has been disclosed above, the power source module 70 can also be a socket and an AC to DC converter (both not shown in figures) or a socket and a solar panel (both not shown in figures).

Figure 7:
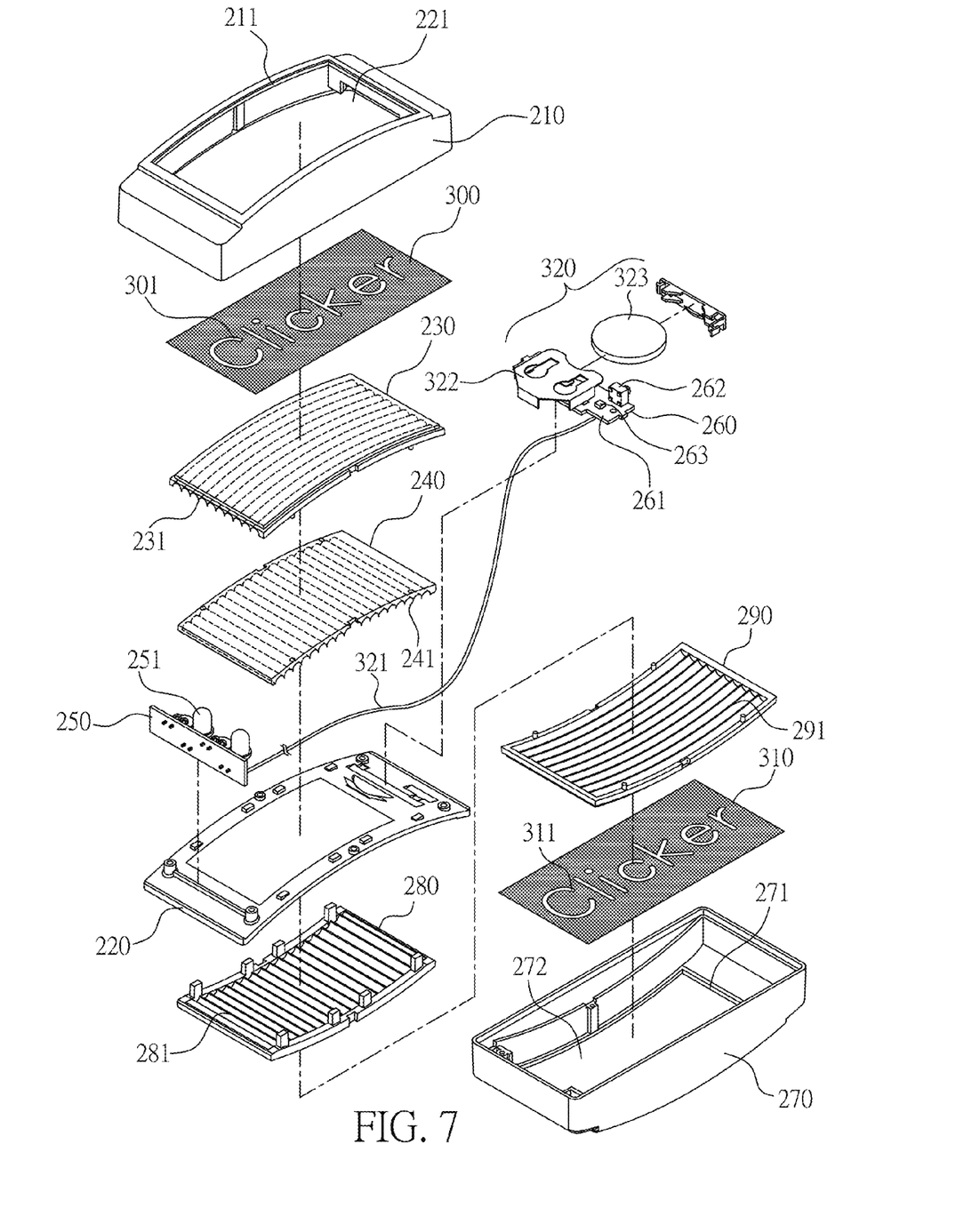
FIG. 7 is an exploded view illustrating the warning device according to one another preferred embodiment of the present invention.
Figure 8:
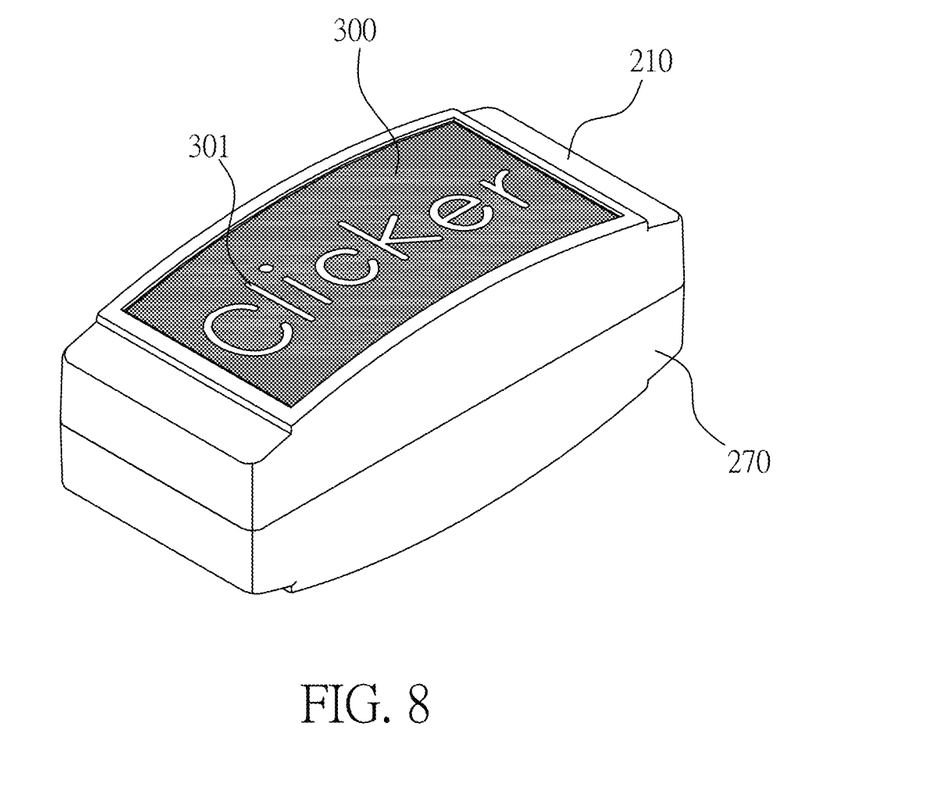
FIG. 8 is a front view illustrating the assembly of the warning device according to one another preferred embodiment of the present invention.
Figure 9:
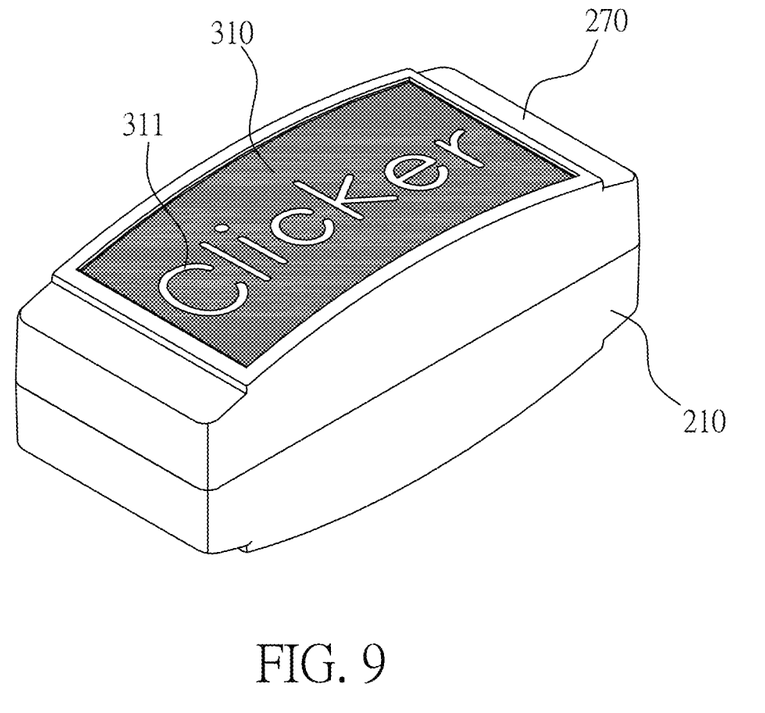
FIG. 9 is a rear view illustrating the assembly of the warning device according to one another preferred embodiment of the present invention.

Referring from FIG. 7 to FIG. 9, wherein FIG. 7 is an exploded view illustrating the warning device according to one another preferred embodiment of the present invention; FIG. 8 is a front view illustrating the assembly of the warning device according to one another preferred embodiment of the present invention; and FIG. 9 is a rear view illustrating the assembly of the warning device according to one another preferred embodiment of the present invention.

As shown in figures, according to one another embodiment of the present invention, the warning device includes: a top housing 210, a bottom cover 220, a first light guide plate 230, a second light guide plate 240, a light source module 250, a switch module 260, a bottom housing 270, a third light guide plate 280 and a fourth light guide plate 290.

The top housing 210 is made of an insulation material, e.g. but not limited to plastic, and formed with a first opening 211.

The bottom cover 220 is made of an insulation material, e.g. but not limited to plastic, and disposed at the bottom of the top housing 210, and a first accommodation space 221 is formed through the bottom cover 220 being engaged with the top housing 210.

The first light guide plate 230 is made of a light-pervious material, e.g. but not limited to a red plastic plate, and e.g. but not limited to be formed in a bending status or a planar status; the first light guide plate 230 is accommodated in the first accommodation space 221 and partially exposed outside the first opening 211, and formed with a plurality of first light guide strips 231, the plural first light guide strips 231 are e.g. but not limited to be formed in a U shape, and disposed at the bottom of the first light guide plate 230, each of the first light guide strips 231 is parallel to each other and arranged towards a direction e.g. but not limited to a horizontal direction. According to this embodiment, the first light guide plate 230 being formed in the bending status is adopted for illustration and shall not be a limitation to the scope of the present invention.

The second light guide plate 240 is made of a light-pervious material, e.g. but not limited to a red plastic plate, and e.g. but not limited to be formed in a bending status or a planar status; the second light guide plate 240 is disposed at the bottom of the first light guide plate 230, and formed with a plurality of second light guide strips 241, the plural second light guide strips 241 are e.g. but not limited to be formed in a U shape, each of the second light guide strips 241 is parallel to each other and arranged towards a direction e.g. but not limited to a vertical direction, the arranged direction of the plural second light guide strips 241 is perpendicular to the arranged direction of the plural first light guide strips 231, the plural second light guide strips 241 and the plural first light guide strips 231 are vertically stacked thereby forming a plurality of cross points arranged in an array format. According to this embodiment, the second light guide plate 240 being formed in the bending status is adopted for illustration and shall not be a limitation to the scope of the present invention.

The light source module 250 is disposed at one side of the second light guide plate 240, e.g. but not limited to the left side, the right side or the rear side, and installed with at least a LED 251, the quantity thereof is e.g. but not limited to four, wherein two of the LEDs 251 are oriented towards upward, and the other two LEDs 251 are bent for 180 degrees for being oriented towards downward, the light emitting direction is preferably to be perpendicular to the plural second light guide strips 241 and plural fourth light guide strips 291, and the LED 251 is e.g. but not limited to a high-brightness white light LED. Wherein, when the light source module 250 is disposed at the left side or the right side of the second light guide plate 240, the lights emitted by the LED 251 can project from the left side or the right side and be guided through two end parts of the U-shaped second light guide strips 241 then be guided through two end parts of the U-shaped first light guide strips 231 so as to be outputted, thereby forming plural cross points arranged in an array format. When the light source module 250 is disposed at the rear side of the second light guide plate 240, the lights emitted by the LED 251 can project from the rear side and be guided through two end parts of the U-shaped second light guide strips 241 then be guided through two end parts of the U-shaped first light guide strips 231 so as to be outputted, thereby forming plural cross points arranged in an array format, and the brightness generated is greater than the brightness generated through the light source module 250 being disposed at the left side or the right side.

The switch module 260 is accommodated in the first accommodation space 221 and installed with a printed circuit board 261, the printed circuit board 261 is provided with a switch 262 and a microcontroller 263, when the switch 262 is pressed, the microcontroller 263 drives the LED 251, so a plurality of pointy light sources with even brightness are obtained through the cross points arranged in the array format formed by the plural second light guide strips 241 and the plural first light guide strips 231.

The bottom housing 270 is made of an insulation material, e.g. but not limited to plastic, and formed with a second opening 271 and disposed at the bottom of the bottom cover 220, a second accommodation space 272 is formed through the bottom housing 270 being engaged with the bottom cover 220.

The third light guide plate 280 is made of a light-pervious material, e.g. but not limited to a red plastic plate, and e.g. but not limited to be formed in a bending status or a planar status; the third light guide plate 280 is accommodated in the second accommodation space 272 and partially exposed outside the second opening 271, and formed with a plurality of third light guide strips 281, the plural third light guide strips 281 are e.g. but not limited to be formed in a U shape, and disposed at the bottom of the third light guide plate 280, each of the third light guide strips 281 is parallel to each other and arranged towards a direction e.g. but not limited to a horizontal direction. According to this embodiment, the third light guide plate 280 being formed in the bending status is adopted for illustration and shall not be a limitation to the scope of the present invention.

The fourth light guide plate 290 is made of a light-pervious material, e.g. but not limited to a red plastic plate, and e.g. but not limited to be formed in a bending status or a planar status; the fourth light guide plate 290 is disposed at the bottom of the third light guide plate 280, and formed with a plurality of fourth light guide strips 291, the plural fourth light guide strips 291 are e.g. but not limited to be formed in a U shape, each of the fourth light guide strips 291 is parallel to each other and arranged towards a direction e.g. but not limited to a vertical direction, the arranged direction of the plural fourth light guide strips 291 is perpendicular to the arranged direction of the plural third light guide strips 281, the plural fourth light guide strips 291 and the plural third light guide strips 281 are vertically stacked thereby forming a plurality of cross points arranged in an array format. According to this embodiment, the fourth light guide plate 290 being formed in the bending status is adopted for illustration and shall not be a limitation to the scope of the present invention.

In addition, the warning device provided by the present invention further includes a first light-pervious plate 300 and a second light-pervious plate 310, wherein the first light-pervious plate 300 is disposed at the bottom of the first opening 211 and formed with a pattern or text 301, e.g. but not limited to the trade mark "Clicker" granted trademark to the applicant of the present invention, the pattern or text 301 is able to be displayed through lights, the second light-pervious plate 310 is disposed at the top of the second opening 271 and formed with a pattern or text 311, the pattern or text 311 is able to be displayed through lights.

Moreover, the warning device provided by the present invention further includes a power source module 320, which is coupled to the switch module 260 and coupled to the light source module 250 disposed at the opposite side through a wire 321 for supplying the required electric power. Wherein, the power source module 320 is e.g. but not limited to a battery, or includes a battery seat and a button cell battery; according to this embodiment, a battery seat 322 and a button cell battery 323 are adopted for illustration and shall not be a limitation to the scope of the present invention, wherein one end of the battery seat 322 is fastened on the printed circuit board 261, and the other end thereof is fastened on the bottom cover 220.

Or, the power source module 320 can further includes a socket and a AC to DC converter (both not shown in figures), the AC to DC converter is serve to convert an AC power source into a DC power source then be inserted in the socket for supplying the required electric power.

Or, the power source module 320 can further includes a socket and a solar panel (both not shown in figures), the solar panel is serve to convert sunlight into a DC power source then be inserted in the socket for supplying the required electric power.

As shown in FIG. 8 and FIG. 9, after being assembled, the warning device provided by the present invention respectively enables a small amount of LEDs 251 disposed on the printed circuit board 261 to be arranged at the locations perpendicular to the plural second light guide strips 241, and enables the other LEDs 251 disposed on the printed circuit board 261 to have the pins thereof being bent for 180 degrees then to be arranged at the locations perpendicular to the plural fourth light guide strips 281, so a plurality of pointy light sources with even brightness are enabled to be emitted from the first opening 211 through the cross points arranged in the array format formed by the plural second light guide strips 241 and the plural first light guide strips 231, and a plurality of pointy light sources with even brightness are enabled to be emitted from the second opening 271 through the cross points arranged in the array format formed by the plural fourth light guide strips 291 and the plural third light guide strips 281, thus pedestrians can clearly see the "Clicker" or other text or pattern or other advertisement picture or promotion texts shown by the warning device even from a remote location, objectives of lowering production cost and reducing electric power consumption can therefore be achieved.

Based on what has been disclosed above, advantages achieved by the warning device provided by the present invention are as following: the warning device can be installed on a bicycle, an energy-saving motorbike, a vehicle, an advertisement billboard, a traffic signal or be provided on a cloth or a helmet for displaying the warning pattern or text formed through the plural pointy light sources; only a small amount of LEDs are required for obtaining plural pointy light sources with even brightness and arranged in the array format, thereby being provided with the effects of lowering production cost and reducing the electric power consumption. Accordingly, the warning device provided by the present invention is novel and more practical in use comparing to the conventional warning device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A warning device, including:
   a housing, formed with an opening;
   a bottom cover, disposed at a bottom of said housing, and an accommodation space being formed through said bottom cover being engaged with said housing;
   a first light guide plate, accommodated in said accommodation space and partially exposed outside said opening, and formed with a plurality of first light guide strips;
   a second light guide plate, disposed at a bottom of said first light guide plate, and formed with a plurality of second light guide strips, and an arranged direction of said plural second light guide strips being perpendicular to an arranged direction of said plural first light guide strip;
   a light source module, installed with at least a LED; and
   a switch module, accommodated in said accommodation space, and installed with a printed circuit board, said printed circuit board being provided with a switch and a microcontroller, when said switch being pressed, said microcontroller driving said LED for enabling a plurality of pointy light sources to be formed and emitted through said first light guide plate.

2. The warning device as claimed in claim 1, wherein said first light guide plate and said second light guide plate are formed in a bending status or a planar status.

3. The warning device as claimed in claim 2, wherein said plural first light guide strips and said plural second light guide strips are formed in a U shape, said plural first light guide strips are disposed at the bottom of said first light guide plate, and each of said first light guide strips is parallel to each other and arranged towards a horizontal direction;

said plural second light guide strips are disposed at the bottom of said second light guide plate, and each of said second light guide strips is parallel to each other and arranged towards a vertical direction, wherein said LEDs of said light source module are arranged at the locations perpendicular to said plural second light guide strips.

4. The warning device as claimed in claim 1, further including a power source module which is coupled to said light source module and said switch module for supplying the required electric power, wherein said power source module further includes a socket and a AC to DC converter, said AC to DC converter is serve to convert an AC power source into a DC power source then be inserted in said socket for supplying the required electric power, wherein said power source module is a battery or includes a battery seat and a button cell battery.

5. The warning device as claimed in claim 4, wherein said power source module further includes a socket and a solar panel, said solar panel is serve to convert sunlight into a DC power source then be inserted in said socket for supplying the required electric power.

6. The warning device as claimed in claim 1, wherein said bottom cover is further provided with a light reflection paper used for reflecting the lights emitted by said LED to said plural second light guide strips.

7. The warning device as claimed in claim 1, further including a Velcro fastener which is disposed at the outer side of said bottom cover and used for fastening said warning device on an object.

8. The warning device as claimed in claim 1, further including a first light collecting fasten sheet which is disposed at the top of said first light guide plate and used for fastening said first light guide plate and collecting the lights emitted by said first light guide plate.

9. The warning device as claimed in claim 1, further including a second light collecting fasten sheet which is disposed at the bottom of said second light guide plate and used for fastening said second light guide plate and collecting the lights emitted by said LED.

10. The warning device as claimed in claim 1, further including a light-pervious plate which is disposed at the top of said opening and provided with a pattern or text, said pattern or text is able to be displayed through lights.

11. The warning device as claimed in claim 1, further including a protection sheet which is disposed at the top of said bottom cover, and formed with a protection groove, when being pressed, said protection groove is able to prevent said pattern or text from being deformed.

12. The warning device as claimed in claim 1, wherein said light source module is disposed at the left side, the right side or the rear side of said second light guide plate.

13. A warning device, including:
a top housing, formed with a first opening;
a bottom cover, disposed at a bottom of said top housing, a first accommodation space is formed through said bottom cover being engaged with said top housing;
a first light guide plate, accommodated in said first accommodation space and partially exposed outside said first opening, and formed with a plurality of first light guide strips;
a second light guide plate, disposed at a bottom of said first light guide plate, and formed with a plurality of second light guide strips, and an arranged direction of said plural second light guide strips being perpendicular to an arranged direction of said plural first light guide strips;
a light source module, installed with at least a LED;
a switch module, accommodated in said first accommodation space, and installed with a printed circuit board, said printed circuit board being provided with a switch and a microcontroller;
a bottom housing, formed with a second opening, disposed at a bottom of said bottom cover, a second accommodation space is formed through said bottom housing being engaged with said bottom cover;
a third light guide plate, accommodated in said second accommodation space and partially exposed outside said second opening, and formed with a plurality of third light guide strips; and
a fourth light guide plate, disposed at a bottom of said third light guide plate, and formed with a plurality of fourth light guide strips, and an arranged direction of said plural fourth light guide strips being perpendicular to an arranged direction of said plural third light guide strips;
when said switch is pressed, said microcontroller drives said LED for enabling a plurality of pointy light sources to be formed and emitted through said first light guide plate and said third light guide plate.

14. The warning device as claimed in claim 13, further including a first light-pervious plate and a second light-pervious plate, wherein said first light-pervious plate is disposed at the bottom of said first opening and formed with a pattern or text, said pattern or text is able to be displayed through lights, said second light-pervious plate is disposed at the top of said second opening and formed with a pattern or text, said pattern or text is able to be displayed through lights.

15. The warning device as claimed in claim 13, wherein said third light guide plate and said fourth light guide plate are formed in a bending status or a planar status.

16. The warning device as claimed in claim 13, wherein said plural first light guide strips and said plural second light guide strips are formed in a U shape, said plural first light guide strips are disposed at the bottom of said first light guide plate, and each of said first light guide strips is parallel to each other and arranged towards a horizontal direction; said plural second light guide strips are disposed at the bottom of said second light guide plate, and each of said second light guide strips is parallel to each other and arranged towards a vertical direction, wherein said LEDs of said light source module are arranged at the locations perpendicular to said plural second light guide strips; said plural third light guide strips and said plural fourth light guide strips are formed in a U shape, said plural third light guide strips are disposed at the bottom of said third light guide plate, and each of said third light guide strips is parallel to each other and arranged towards a horizontal direction; said plural fourth light guide strips are disposed at the bottom of said fourth light guide plate, and each of said fourth light guide strips is parallel to each other and arranged towards a vertical direction.

17. The warning device as claimed in claim 13, further including a power source module which is coupled to said light source module and said switch module for supplying the required electric power.

18. The warning device as claimed in claim 17, wherein said power source module further includes a socket and a AC to DC converter, said AC to DC converter is serve to convert an AC power source into a DC power source then be inserted in said socket for supplying the required electric power, wherein said power source module is a battery or includes a battery seat and a button cell battery.

19. The warning device as claimed in claim 17, wherein said light source module is disposed at the left side, the right side or the rear side of said second light guide plate and said fourth light guide plate.

20. The warning device as claimed in claim 17, wherein said power source module further includes a socket and a solar panel, said solar panel is serve to convert sunlight into a DC power source then be inserted in said socket for supplying the required electric power.

\* \* \* \* \*